(12) United States Patent
 Nakamura

(10) Patent No.: US 11,175,566 B2
(45) Date of Patent: Nov. 16, 2021

(54) IMAGING DEVICE

(71) Applicant: NIDEC COPAL CORPORATION, Tokyo (JP)

(72) Inventor: Yuta Nakamura, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 129 days.

(21) Appl. No.: 16/498,461

(22) PCT Filed: Mar. 30, 2018

(86) PCT No.: PCT/JP2018/013586
§ 371 (c)(1),
(2) Date: Sep. 27, 2019

(87) PCT Pub. No.: WO2018/181888
PCT Pub. Date: Oct. 4, 2018

(65) Prior Publication Data
US 2021/0191235 A1    Jun. 24, 2021

(30) Foreign Application Priority Data

Mar. 31, 2017   (JP) .............................. JP2017-069423

(51) Int. Cl.
*G03B 17/14* (2021.01)
*G03B 17/08* (2021.01)
*H04N 5/225* (2006.01)

(52) U.S. Cl.
CPC .............. *G03B 17/14* (2013.01); *G03B 17/08* (2013.01); *H04N 5/2254* (2013.01)

(58) Field of Classification Search
None
See application file for complete search history.

(56) References Cited

U.S. PATENT DOCUMENTS

| 2010/0157141 A1 | 6/2010 | Ouyang | |
| 2011/0199485 A1* | 8/2011 | Nakamura | H04N 5/2252 348/148 |
| 2019/0116298 A1* | 4/2019 | Tsai | H04N 5/2252 |

FOREIGN PATENT DOCUMENTS

| JP | 2008-70790 A | 3/2008 |
| JP | 2008-90180 A | 4/2008 |
| JP | 2010-251843 A | 11/2010 |
| JP | 2011-164461 A | 8/2011 |
| JP | 2015-118166 A | 6/2015 |

OTHER PUBLICATIONS

International Search Report issued in corresponding International Application No. PCT/JP2018/013586 dated Jul. 3, 2018.

* cited by examiner

*Primary Examiner* — William B Perkey
(74) *Attorney, Agent, or Firm* — Troutman Pepper Hamilton Sanders LLP

(57) ABSTRACT

An imaging device, having a substrate on which an imaging portion is mounted, a lens barrel for holding a lens, and a case disposed so as to cover the lens barrel and the substrate, wherein: the lens barrel and the case are fitted radially, and the lens barrel and the case comprise a rotation constraining portion for constraining mutual rotation thereof, in respect to the optical axial direction.

3 Claims, 6 Drawing Sheets

[FIG. 1]
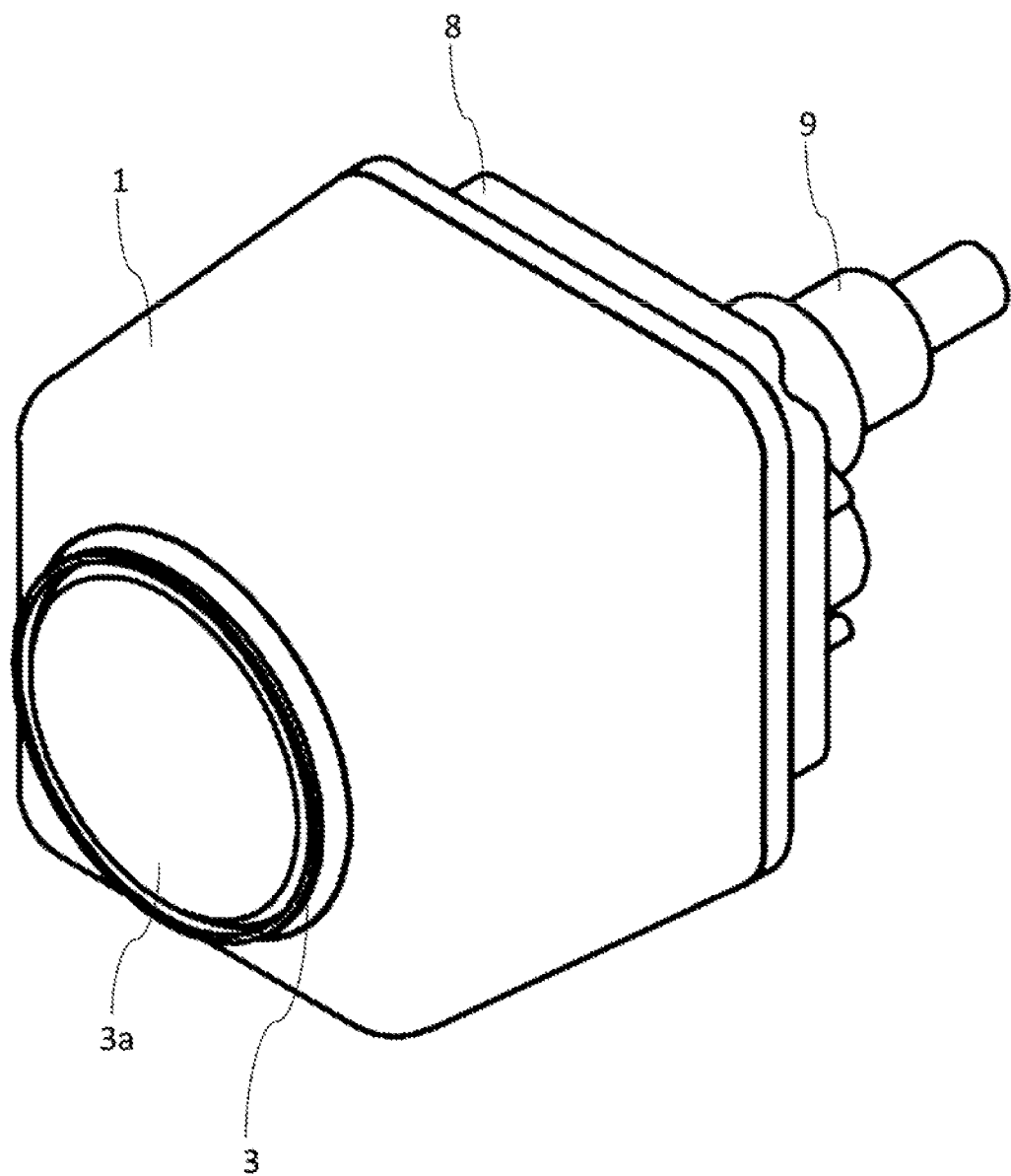

[FIG. 2]
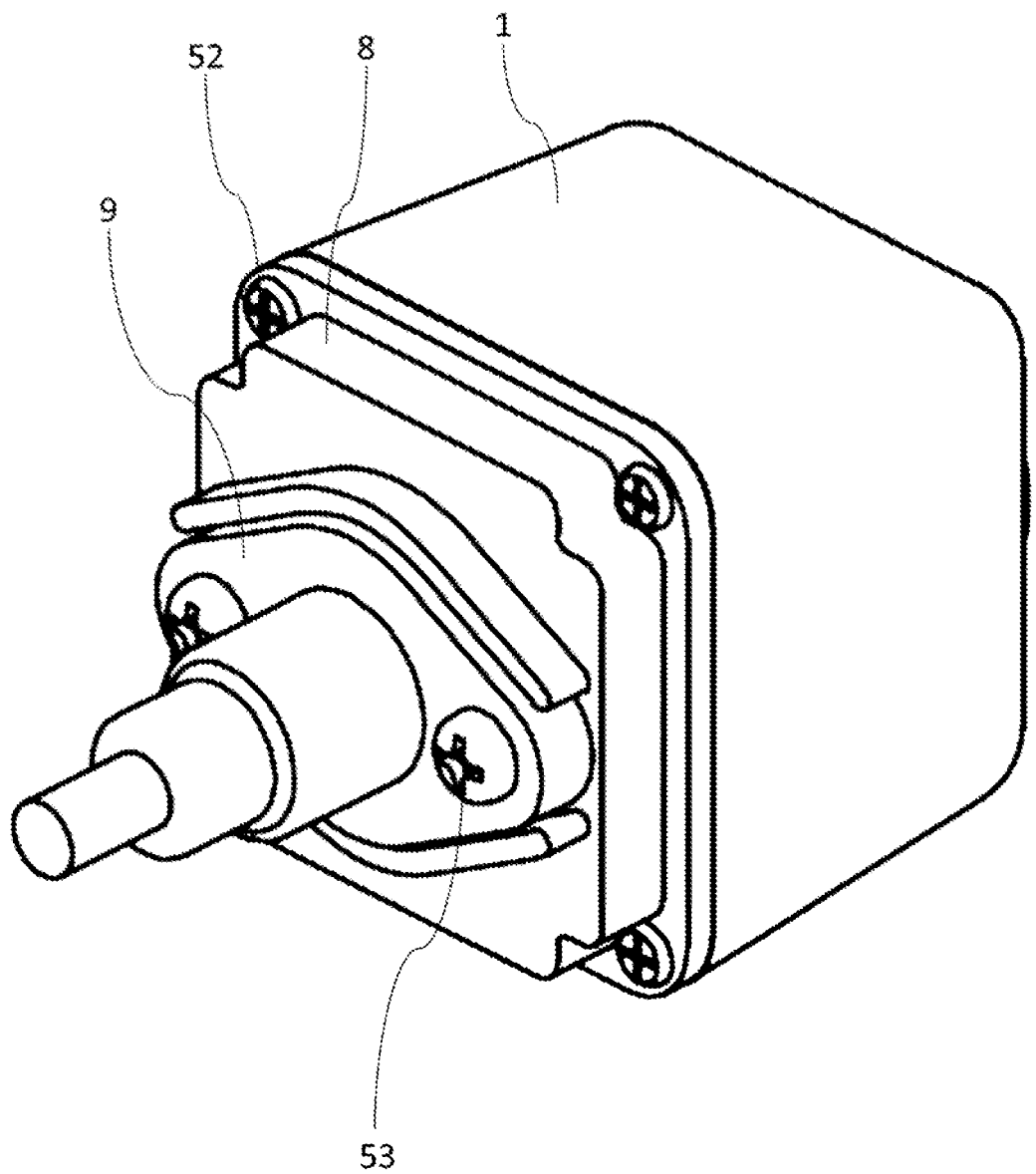

[FIG. 3]
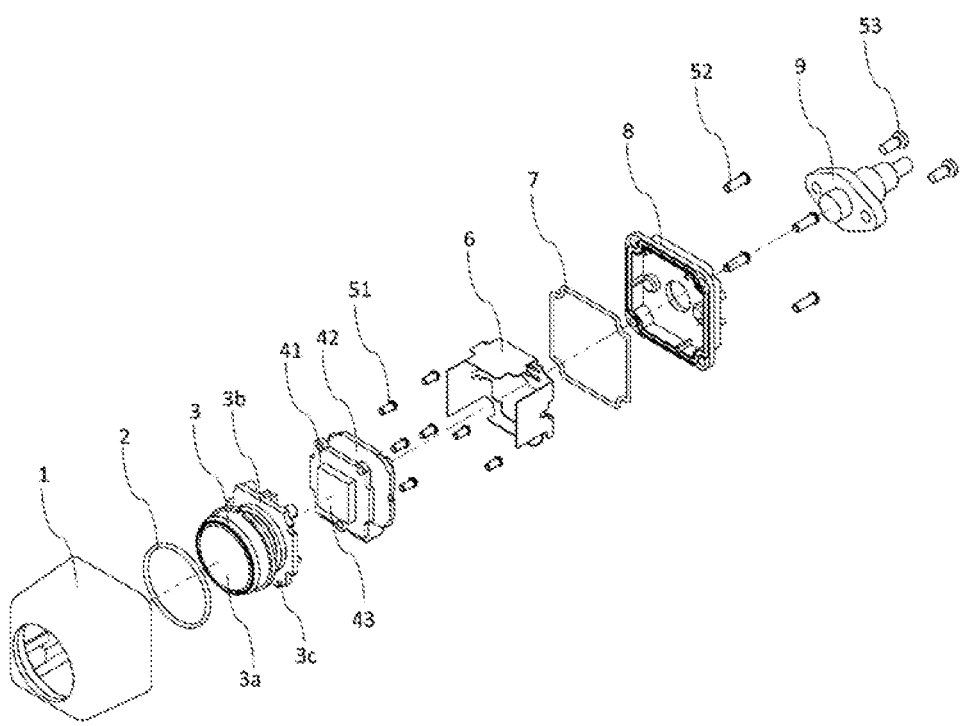

[FIG. 4]
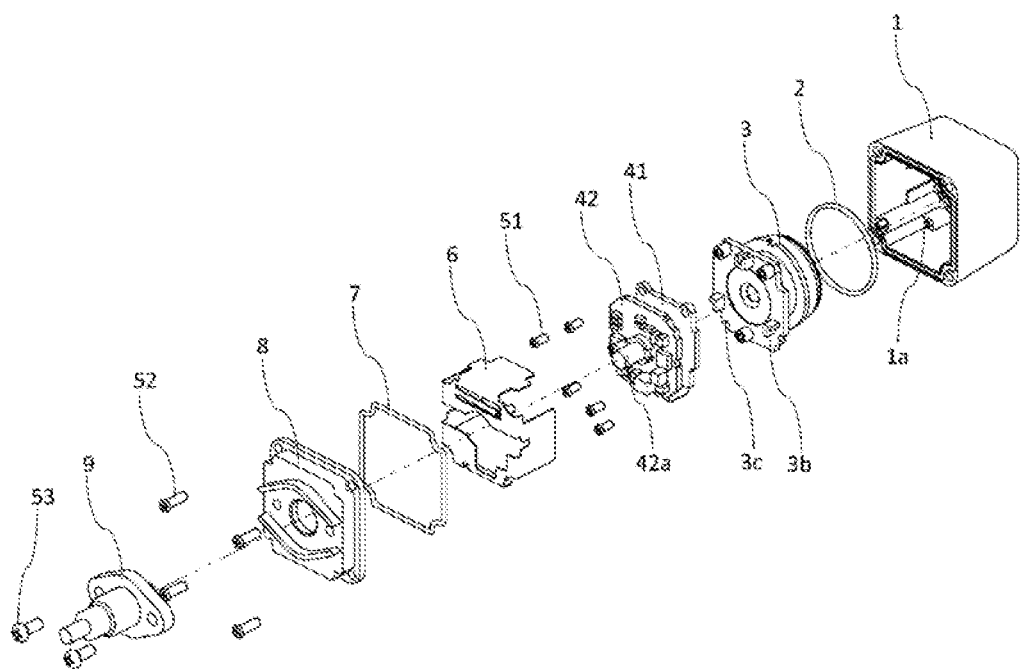

[FIG. 5]
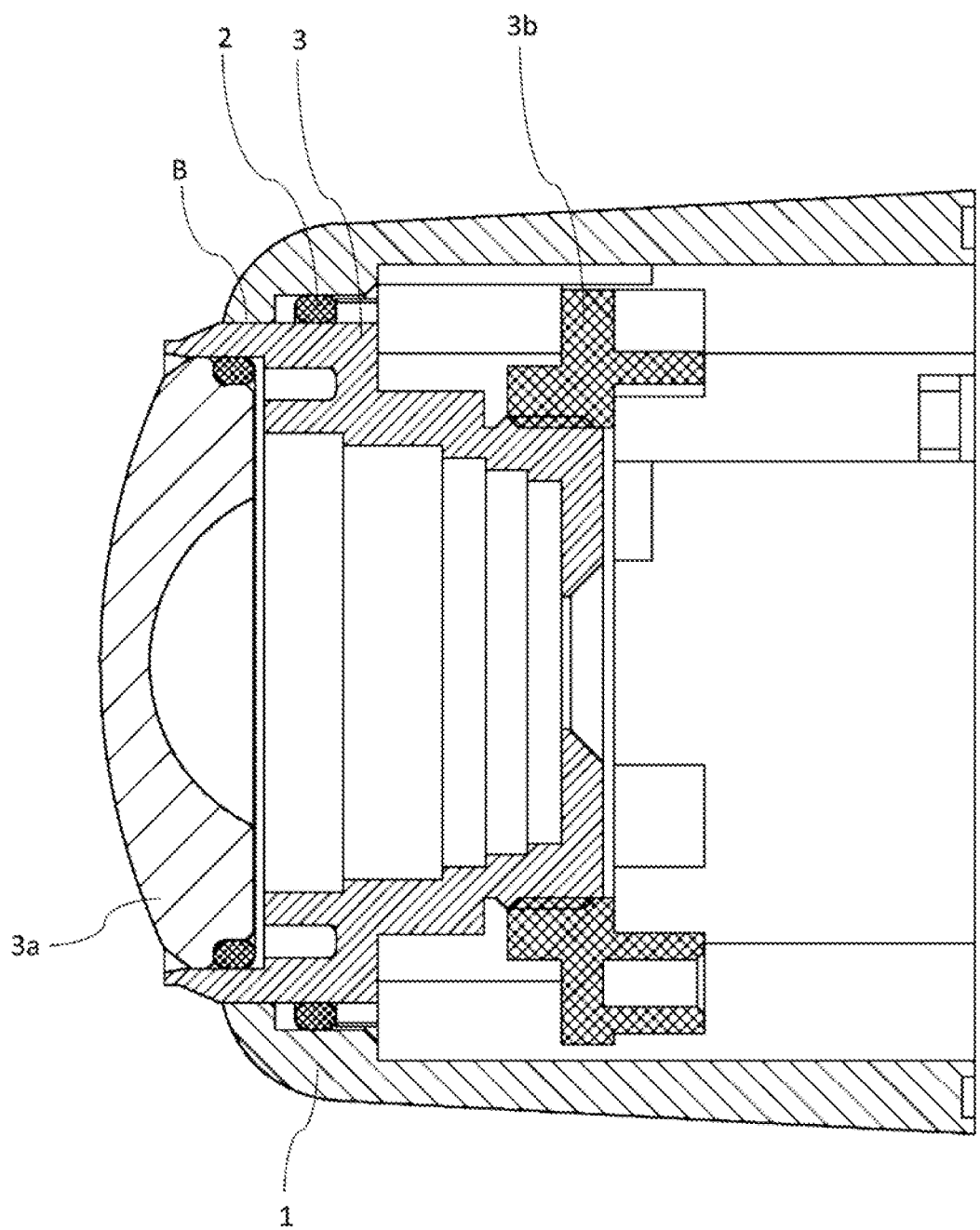

[FIG. 6]
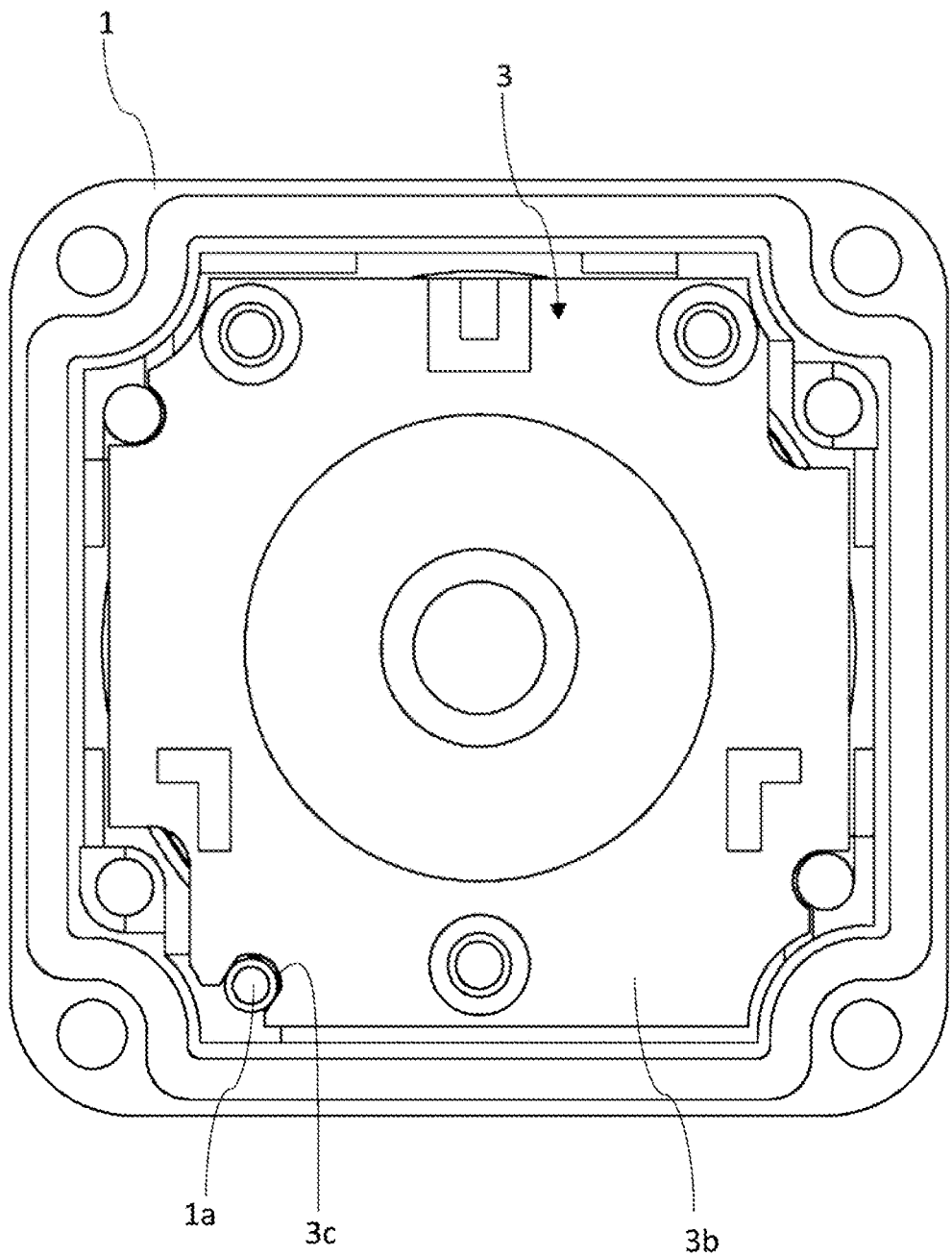

IMAGING DEVICE

CROSS-REFERENCE TO RELATED APPLICATIONS

This Application is a National Stage of International Application No. PCT/JP2018/013586 filed Mar. 30, 2018 which claims priority to Japanese Patent Application No. 2017-069423 filed Mar. 31, 2017. All of the above applications are incorporated herein in their entirety.

FIELD OF TECHNOLOGY

One aspect of the present invention relates to an imaging device.

BACKGROUND

In order to improve the accuracy of the positioning of the optical axis in an imaging device wherein a lens barrel and a substrate on which an imaging element is mounted are contained in a case, it is necessary to secure the position of the lens barrel in respect to the case with good accuracy. A structure wherein the lens barrel is fitted into an opening portion that is provided in a front case is used in Japanese Unexamined Patent Application Publication 2011-164461 as a structure for securing the lens barrel to the case in this way.

SUMMARY

In imaging devices, such as vehicle-mounted cameras, and the like, in recent years it has become necessary to adjust the position of the optical axis with greater accuracy than in the past. However, in a structure, such as that which is conventional, wherein the position is secured by merely fitting the lens barrel into the case, the position in the rotational direction is not secured, and while in the image that is captured the optical axis center is aligned, the image might end up rotated.

The present invention adopts means such as the following in order to solve the problem described above. Note that while in the explanation below, reference symbols from the drawings are written in parentheses for ease in understanding the present invention, the individual structural elements of the present invention are not limited to those that are written, but rather should be interpreted broadly, in a range that could be understood technically by a person skilled in the art.

One example according to the present invention is an imaging device, having a substrate for mounting an imaging portion; a lens barrel for holding a lens group; and a case disposed so as to cover the lens barrel and the substrate, wherein: the lens barrel and the case are fitted radially (e.g. diameter-fitted); and the lens barrel and the case are provided with a rotation constraining portion for constraining mutual rotation thereof in respect to the optical axial direction.

The imaging device of the structure set forth above can be structured so as to prevent rotation, around the optical axis, of the lens barrel in respect to the case, through a rotation constraining portion. This enables prevention of the image captured by the imaging portion from ending up a rotated image.

Preferably in the imaging device set forth above the case has an opening portion; and the lens barrel fits with the opening portion of the case.

The imaging device of the structure set forth above enables a structure that can prevent effectively not only misalignment of the case and the lens barrel in the direction of rotation, but also misalignment in directions that are perpendicular to the optical axis, through a configuration wherein the case fits with the lens barrel in an opening portion of the case.

Preferably the imaging device set forth above further has a waterproofing seal that is disposed around the opening portion, between the lens barrel and the case in the radial direction.

The imaging device structured as described above enables superior waterproofing performance through the ability to produce an essentially uniform compression ratio of the waterproofing seal.

Optionally, in the imaging device set forth above the rotation constraining portion includes a protruding portion of either the lens barrel or the case; and a contacting portion, of the other of either the case or the lens barrel, for constraining movement of the protruding portion in a direction of rotation around the optical axis.

The imaging device structured as described above enables a structure that prevents rotation of the lens barrel in respect to the case through a simple structure of a protruding portion and a contacting portion.

In the imaging device set forth above the protruding portion is cylindrical.

The imaging device of the structure set forth above enables a structure that easily prevents rotation of the lens barrel in respect to the case, through the ability to use a structure wherein the protruding portion and the contacting portion make a stable contact.

Optionally, in the imaging device set forth above the protruding portion and the contacting portion make contact at two points wherein a straight line that extends from the center of the protruding portion, which is perpendicular to a straight line that connects the center of the protruding portion and the center of the fitting position of the lens barrel and the opening portion of the case, contact the contacting portion.

The imaging device of the structure set forth above makes it possible to prevent, with high precision, rotation of the lens barrel in respect to the case, through a simple structure of a cylindrical protruding portion and a contacting portion.

BRIEF DESCRIPTIONS OF THE DRAWINGS

FIG. 1 is an exterior perspective diagram of an imaging device according to an embodiment, viewed from the front side.

FIG. 2 is an exterior perspective diagram of an imaging device according to an embodiment, viewed from the rear side.

FIG. 3 is an assembly perspective diagram of an imaging device according to an embodiment, viewed from the front side.

FIG. 4 is an assembly perspective diagram of an imaging device according to an embodiment, viewed from the rear side.

FIG. 5 is a cross-sectional diagram of the imaging device according to the present embodiment.

FIG. 6 is a plan view wherein the state wherein a front case and a lens barrel, according to an embodiment, are connected, viewed from the rear side.

DETAILED DESCRIPTION

The imaging device according to the present invention has, as a distinctive feature, the point that it is structured equipped with a rotation constraining portion for preventing rotation of the lens barrel in respect to the front case, in the plane that is perpendicular to the optical axis.

Note that in this Specification, the position of the center of the lens, that is, the position of the center of the light that is incident into the imaging element, is termed the "optical axis." The object that is imaged, positioned on the side of the lens that is opposite from the imaging element, will be termed the "imaging subject." The direction in which the imaging subject is position, in respect to the imaging element, will be termed the "front side" or "optical axial forward direction," and the direction at which the imaging element is positioned, in respect to the imaging subject, will be termed the "rear side" or "optical axial rearward direction."

An embodiment according to the present invention will be explained following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

Embodiments according to the present invention will be explained in reference to the drawings. FIG. 1 and FIG. 2 are exterior perspective diagrams of an imaging device according to the present embodiment, wherein FIG. 1 is a diagram seen from the front side and FIG. 2 is a diagram seen from the rear side. FIG. 3 and FIG. 4 are perspective assembly diagrams of an imaging device according to the present embodiment, wherein FIG. 3 is a diagram seen from the front side and FIG. 4 is a diagram seen from the rear side. FIG. 5 is a cross-sectional diagram of the imaging device according to the present embodiment. FIG. 6 is a plan view, viewed from the rear side, wherein the state wherein a front case and a lens barrel are connected in an imaging device according to the present invention.

As depicted in FIG. 1 through FIG. 6, an imaging device according to the present embodiment is structured including a front case 1, a waterproofing seal 2, a lens barrel 3, a first substrate 41, a second substrate 42, a shield plate 6, a waterproofing seal 7, a rear case 8, a connector 9, and couplings 51, 52, and 53.

<Front Case 1>

The front case 1 is a member for forming the case of the imaging device, together with the rear case 8, and is formed from resin, or the like. The front case 1 has an opening portion, centered on the optical axis, in the optical axial forward direction, and, in the optical axial rearward direction, is open, so as to be able to connect to the rear case 8, and has side faces in essentially a rectangular shape, so as to cover the optical axis. By connecting the front case 1 and the rear case 8, a space is formed that contains the lens barrel 3, the first substrate 41, the second substrate 42, and the like. As depicted in FIG. 1, the lens 3a, which is held by the lens barrel 3, is positioned in the opening portion in the optical axial forward direction of the front case 1. The front case 1 and the lens barrel 3 are fitted radially (e.g. diameter engaged) through contact at the position of "B" in FIG. 5, which is the opening portion in the front case 1.

<Protruding Portion 1a>

As depicted in FIG. 4 and FIG. 6, the front case 1 has a protruding portion 1a that protrudes in the shape of a rod in the optical axial rearward direction. The protruding portion 1a is a cylinder. In the assembled state, the outer periphery of the protruding portion 1a contacts a notch portion 3c of the lens flange 3b.

<Rear Case 8>

The rear case 8, through connection to the front case 1, as described above, forms a space for containing the lens barrel 3, the first substrate 41, the second substrate 42, and the like. The rear case 8 is a plate-shaped member having a surface that is essentially perpendicular to the optical axis. The rear case 8 has an opening portion in the optical axial rearward direction. A protruding portion of a connector 9 is inserted into the opening portion of the rear case 8. The rear case 8 is connected to the front case 1 through a coupling 52, and connected to the connector 9 through a coupling 53.

<Waterproofing Seal 2>

The waterproofing seal 2 is a circular ring-shaped member is formed from an elastic material such as rubber, and is disposed between the front case 1 and the lens barrel 3 to act to connect the front case 1 and the lens barrel 3 together without a gap. The waterproofing seal 2 is disposed on the inside, in the radial direction, of the front case 1 and the outside, in the radial direction, of the lens barrel 3 (referencing FIG. 5), and forms a circular ring-shaped along the position on the inner edge of the front case 1. The waterproofing seal 2 is disposed in the vicinity of the position of fitting between the lens barrel 3 and the front case 1, which is a position in the optical axial rearward direction of the position "B" of the radial fitting between the lens barrel 3 and the front case 1.

<Lens Barrel 3>

The lens barrel 3 is structured including a cylindrical lens barrel portion that extends in the optical axial direction, and a lens flange 3b. The lens barrel 3 holds at least one optical member, including a lens 3a. Optical members held in the lens barrel 3 include, in addition to the lens 3a, lenses, spacers, aperture plates, optical filters, and the like. The lens that includes the lens 3a is formed from a raw material that has transparency, such as glass, plastic, or the like, and refracts and transmits, in the optical axial rearward direction, the light from the optical axial forward direction. The spacers are flat annular ring-shaped members having an appropriate thickness in the optical axial direction, to adjust the positions of the individual lenses in the optical axial direction. The spacers have opening portions in the center portions thereof, including the optical axis. The aperture plate determines the outermost position of the light that passes therethrough. The optical filters suppress or block light of prescribed wavelengths. Optical filters include, for example, infrared radiation cut filters that reduce the infrared radiation that passes therethrough. The number of these optical members can be changed arbitrarily.

<Lens Flange 3b>

The lens flange 3b is a plate-shaped member that is disposed in the optical axial rearward direction of the lens barrel portion in the lens barrel 3. The lens flange 3b has a notch portion 3c that is positioned facing the protruding portion 1a of the front case 1. In the assembled state, the notch portion 3c is in contact with the protruding portion 1a, to thereby constrain the rotational movement, about the optical axis, of the lens barrel 3 in respect to the front case 1. Note that the notch portion 3c is an example of a "contacting portion" in the present invention. Moreover, the combination of the notch portion 3c and the protruding portion 1a is an example of a "rotation constraining portion" in the present invention.

More specifically, the notch portion 3c makes contact with the protruding portion 1a at two points wherein a straight line that extends from the center of the protruding portion 1a that is a straight line that is perpendicular to the straight line that connects the center of the protruding portion 1a with the center of the fitting position of the lens barrel 3 and the front case 1 (the optical axis), in the plane that is perpendicular to the optical axis, contacts the notch portion 3c. This prevents, with high accuracy, rotation of the lens barrel 3 in respect to the front case 1.

<First Substrate 41 and Second Substrate 42>

The first substrate 41 and the second substrate 42 are rigid substrates on which electronic components, including the imaging element 43, are mounted. In the present embodiment, the imaging element 43 and electronic components are mounted on the first substrate 41, and electronic components are mounted on the second substrate 42. The first substrate 41 and the second substrate 42 are connected electrically through lead wires that are installed on a flexible substrate. The electric signals acquired from the imaging element 43 are subjected to prescribed electronic processing or signal processing by the electronic components that are mounted on the first substrate 41 and the second substrate 42, and then outputted as image data to outside of the imaging device. The first substrate 41 and the second substrate 42 are secured by the coupling 51 at positions within the imaging device. The surroundings of the first substrate 41 and the second substrate 42 are covered by a shield plate 6.

The imaging element 43 is a photoelectric converting element for converting the incident light into electric signals, and is, for example, a CMOS sensor, a CCD, or the like, although there is no limitation thereto. Moreover, in the imaging device, an imaging portion other than the imaging element 43, having an imaging function, may be used instead. The imaging element is an example of an "imaging portion" in the present invention.

<Shield Plate 6>

The shield plate 6 is formed from an electrically conductive plate-shaped member, and, in the assembled state, is disposed so as to cover the first substrate 41 and the second substrate 42. This enables electromagnetic noise from the outside to be cut off by the shield plate 6, making possible to prevent malfunctions, and the like, due to the effects of the electromagnetic noise on the first substrate 41 and the second substrate 42.

<Waterproofing Seal 7>

The waterproofing seal 7 is a member that is formed from an elastic material such as rubber, as with the waterproofing seal 2, and is disposed between the front case 1 and the rear case 8, to act so as to connect the front case 1 and the rear case 8 without a gap. The waterproofing seal 7 has a shape corresponding to the connecting surface of the front case 1 and the rear case 8, where the waterproofing seal 7 in the present embodiment is a rectangle with a corner portion cutaway.

<Connector 9>

The connector 9 is disposed to the rear of the rear case 8 in the optical axial rearward direction, and connected to the rear case 8 through a coupling 53. The connector 9 connects the imaging device to an external device electrically, and is also used as the attachment for attaching the imaging device to the device to which it is to be attached. The connector 9 is connected to a terminal 42a that protrudes in the optical axial rearward direction from the second substrate 42.

The imaging device according to the present embodiment is structured including the rotation constraining portion that is configured from the protruding portion 1a and the notch portion 3c, as described above, and thus can prevent rotation, about the optical axis, of the lens barrel 3 in respect to the front case 1. This enables prevention of the image that is captured by the imaging element 43 from ending up a rotated image.

Note that the rotation constraining portion need not necessarily be structured from a protruding portion 1a and a notch portion 3c, but rather another structure may be employed insofar as the structure constrains the rotation of the lens barrel 3 in respect to the front case 1. For example, the structure may be one wherein the lens flange 3b of the lens barrel 3 has a protruding portion and the front case 1 has a notch portion. Moreover, instead a structure may be employed that has a through hole or groove portion instead of the notch portion 3c, where the protruding portion 1a is inserted into the through hole or groove portion. That is, a portion of the front case 1 and a portion of the lens barrel 3 may employ a structure wherein they both make contact in the direction of rotation about the optical axis.

Moreover, in the imaging device according to the present embodiment, the lens barrel 3 and the front case 1 are structured so as to be fitted radially at the opening portion of the front case 1, thus preventing the occurrence of misalignment of the lens barrel 3 and the front case 1 in the direction that is perpendicular to the optical axis.

Moreover, in the imaging device according to the present embodiment, the structure is one wherein a waterproofing seal 2 is disposed between the lens barrel 3 and the front case 1, thus enabling the compression ratio of the waterproofing seal 2 to be essentially uniform in the circumferential direction, enabling superior waterproofing performance.

Moreover, in the imaging device according to the present embodiment, the structure has a protruding portion 1a and a notch portion 3c, as an example of a structure for a rotation constraining portion, thus enabling rotation, about the optical axis, of the lens barrel 3 in respect to the front case 1 to be prevented through a simple structure.

Moreover, in the imaging device according to the present embodiment, the protruding portion 1a is cylindrical, thus enabling use of a structure wherein there is stable contact between the protruding portion 1a and the notch portion 3c, thus enabling use of a structure wherein suppression of rotation of the lens barrel 3 in respect to the front case 1 is easy.

Moreover, in the imaging device according to the present embodiment, the protruding portion 1a and the notch portion 3c make contact at two points where the edge portion of the notch portion 3c is contacted by a straight line that extends from the center of the protruding portion 1a that is a straight line that is perpendicular to the straight line that connects the protruding portion 1a and the center of the position wherein the lens barrel 3 and the opening portion of the front case 1 are fitted together (the optical axis).

<2. Supplementary Items>

An embodiment according to the present invention was explained in detail above. The explanation above is no more than an explanation of one form of embodiment, and the scope of the present invention is not limited to this form of embodiment, but rather is interpreted broadly, in a scope that can be understood by one skilled in the art.

In the imaging device of the present embodiment, the positional relationship between the first substrate 41 and the second substrate 42 is arbitrary, and the structure may be one wherein the second substrate 42 is positioned further in the optical axial forward direction than the first substrate 41. Moreover, the structure may be one that is equipped with yet another substrate, in addition to the first substrate 41 and the second substrate 42.

Moreover, there is no limitation to the front case 1 and rear case 8 being structured as in the embodiment. For example, the shape may instead be one wherein the front case 1 is a plate-shaped member that forms a plane that is essentially perpendicular to the optical axial direction, with the rear case 8 having a plate-shaped member, formed in a plane that is essentially perpendicular to the optical axial direction, and side faces that protrude in the optical axial forward direction from the outer edge portion of the plate-shaped member. That is, the front case 1 and the rear case 8 may employ arbitrary shapes that form a case through connecting together. Moreover, the front case 1 and rear case 8 may be formed from a material other than resin.

Furthermore, the lens barrel 3 need not necessarily use a structure that has a lens flange 3b. In this case, the lens barrel 3 would have a structure that has a contacting portion, such as the notch portion 3c.

The present invention can be used suitably for imaging devices, or the like, for vehicle mounting.

The invention claimed is:

1. An imaging device, comprising:
   a substrate for mounting an imaging portion;
   a lens barrel for holding a lens group;
   a case disposed so as to cover the lens barrel and the substrate, wherein:
      the lens barrel and the case are fitted radially;
      the case has an opening portion;
      the lens barrel fits with the opening portion of the case;
      the lens barrel and the case are provided with a rotation constraining portion for constraining mutual rotation thereof in respect to the optical axial direction, the rotation constraining portion comprising:
         a cylindrical protruding portion on the lens barrel or the case; and
         a contacting portion, of the other of either the case or the lens barrel, for constraining movement of the cylindrical protruding portion in a direction or rotation in respect to the optical axis.

2. An imaging device as set forth in claim 1, further comprising:
   a waterproofing seal that is disposed between the lens barrel and the case, in the radial direction.

3. An imaging device as set forth in claim 1, wherein:
   the protruding portion and the contacting portion make contact at two points wherein a straight line that extends from the center of the protruding portion, which is perpendicular to a straight line that connects the center of the protruding portion and the center of the fitting position of the lens barrel and the opening portion of the case, contact the contacting portion.

* * * * *